United States Patent [19]
Lapeyre

[11] 3,888,136
[45] June 10, 1975

[54] ADJUSTABLE PEDAL AND CRANK SYSTEM FOR FOOT PROPELLED VEHICLES

[76] Inventor: Fernand S. Lapeyre, 1224 Octavia St., New Orleans, La. 70115

[22] Filed: June 4, 1974

[21] Appl. No.: 476,207

[52] U.S. Cl. ............... 74/594.1; 74/594.4; 280/259
[51] Int. Cl. ............................................. B62m 3/02
[58] Field of Search............ 74/594.1, 594.2, 594.3, 74/594.4; 280/259, 260, 261

[56] References Cited
UNITED STATES PATENTS

| | | | |
|---|---|---|---|
| 823,712 | 6/1906 | Uhlmann | 74/594.1 |
| 3,789,696 | 2/1974 | Beam | 74/594.1 |

Primary Examiner—Samuel Scott
Assistant Examiner—F. D. Shoemaker
Attorney, Agent, or Firm—Wilkinson, Mawhinney & Theibault

[57] ABSTRACT

The present disclosure is directed to a pedal and crank arm system for bicycles and the like to provide rugged yet safe and easy means for adjusting the effective length of the pedal arms in one quick step if preferred to whatever extent desired within the limits of the full adjustment range, while automatically maintaining the two pedals an equal distance from the axis of the drive shaft at all times. The system further provides simple and positive locking means for insuring fixed effective pedal arm length during pedaling.

The locking means may be easily and quickly disengaged and pedal position adjusting means actuated by the feet of the cyclist either when bicycle is at a standstill or in motion, thereby leaving both hands of cyclist available for guiding and braking. The devices of this disclosure may be installed as original equipment or provided in kit form for modifying bicycles which have other pedal and sprocket arrangements.

10 Claims, 26 Drawing Figures

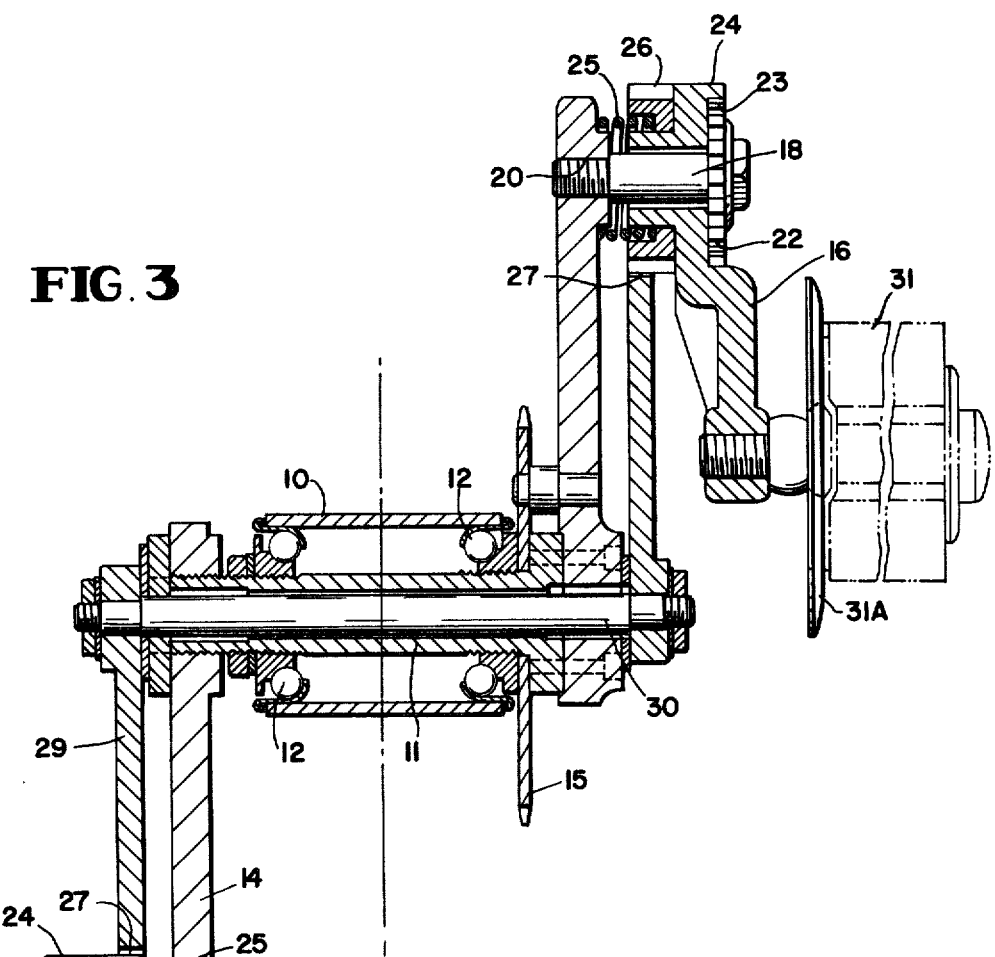
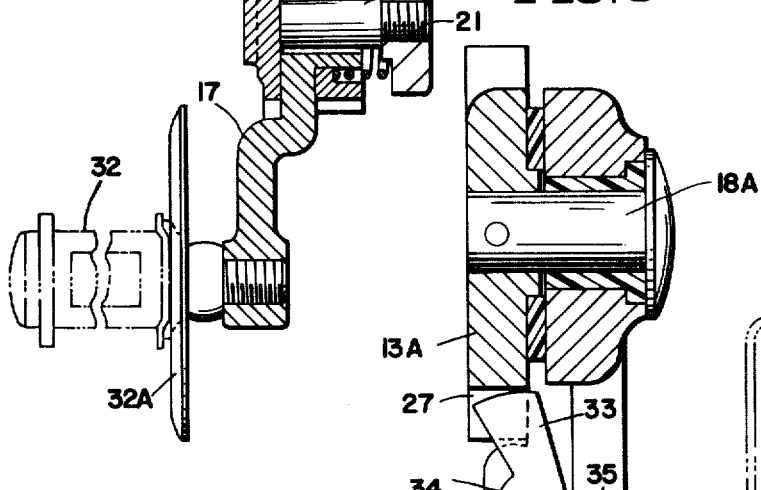
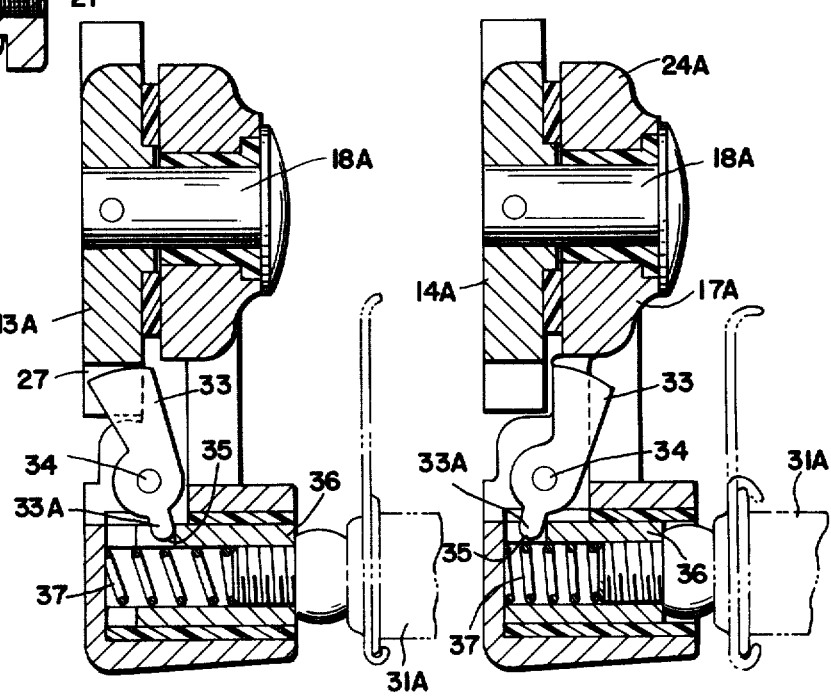
FIG. 3
FIG. 6
FIG. 7

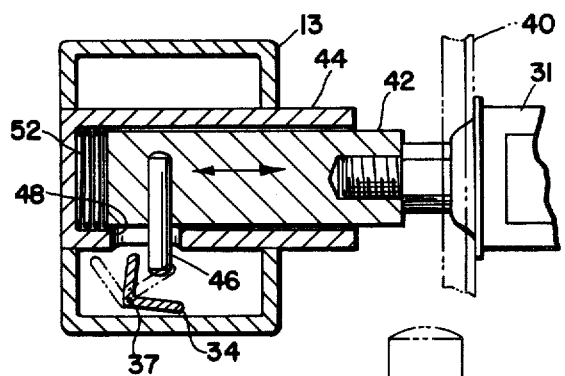
FIG. 11
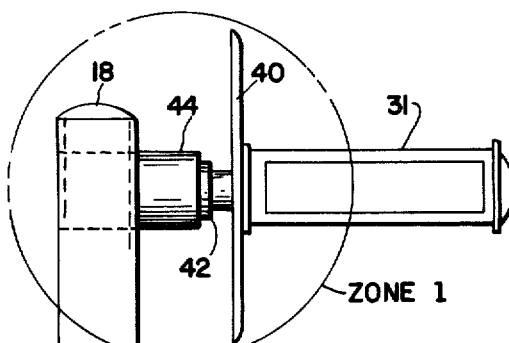
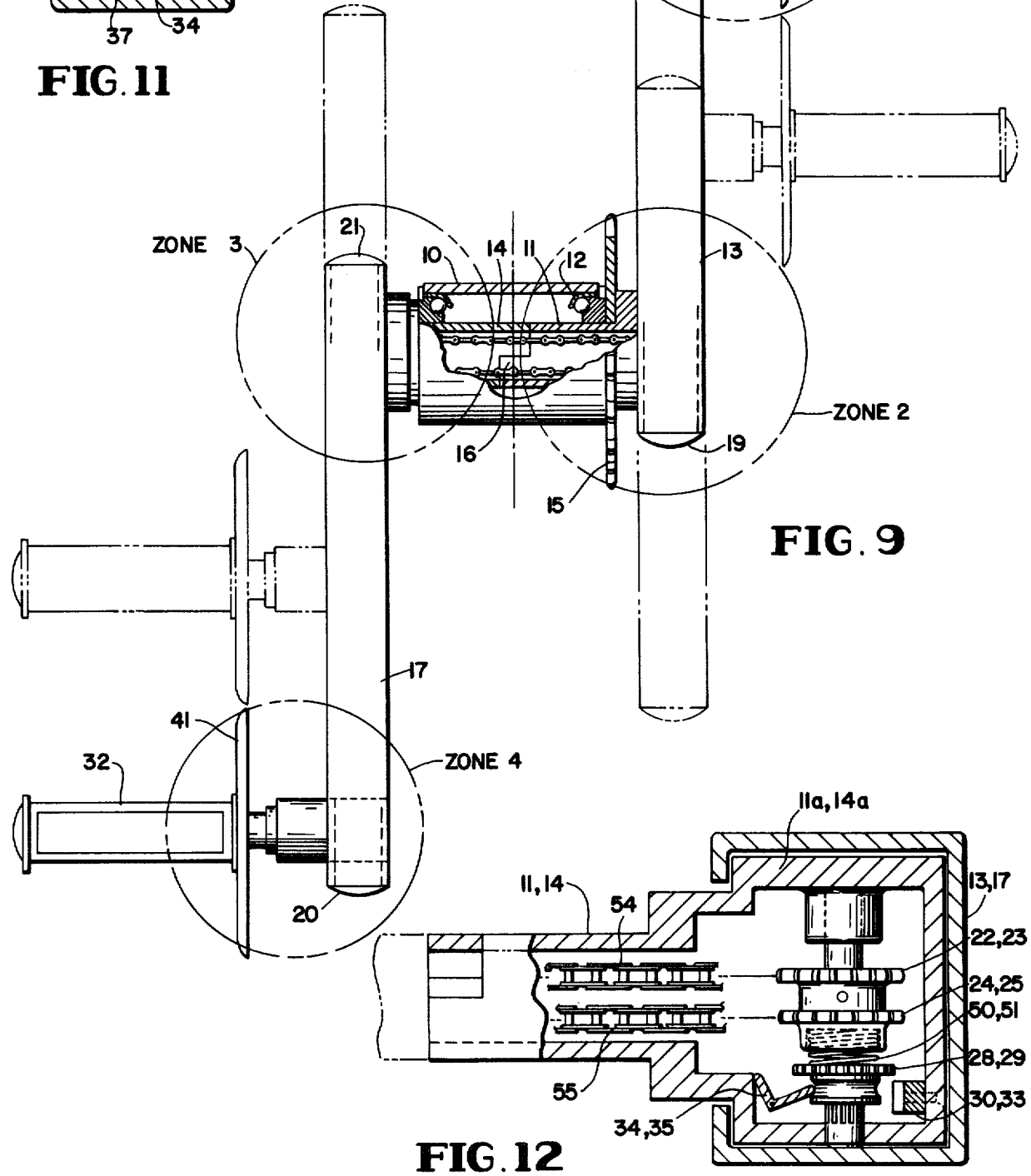
FIG. 9
FIG. 12

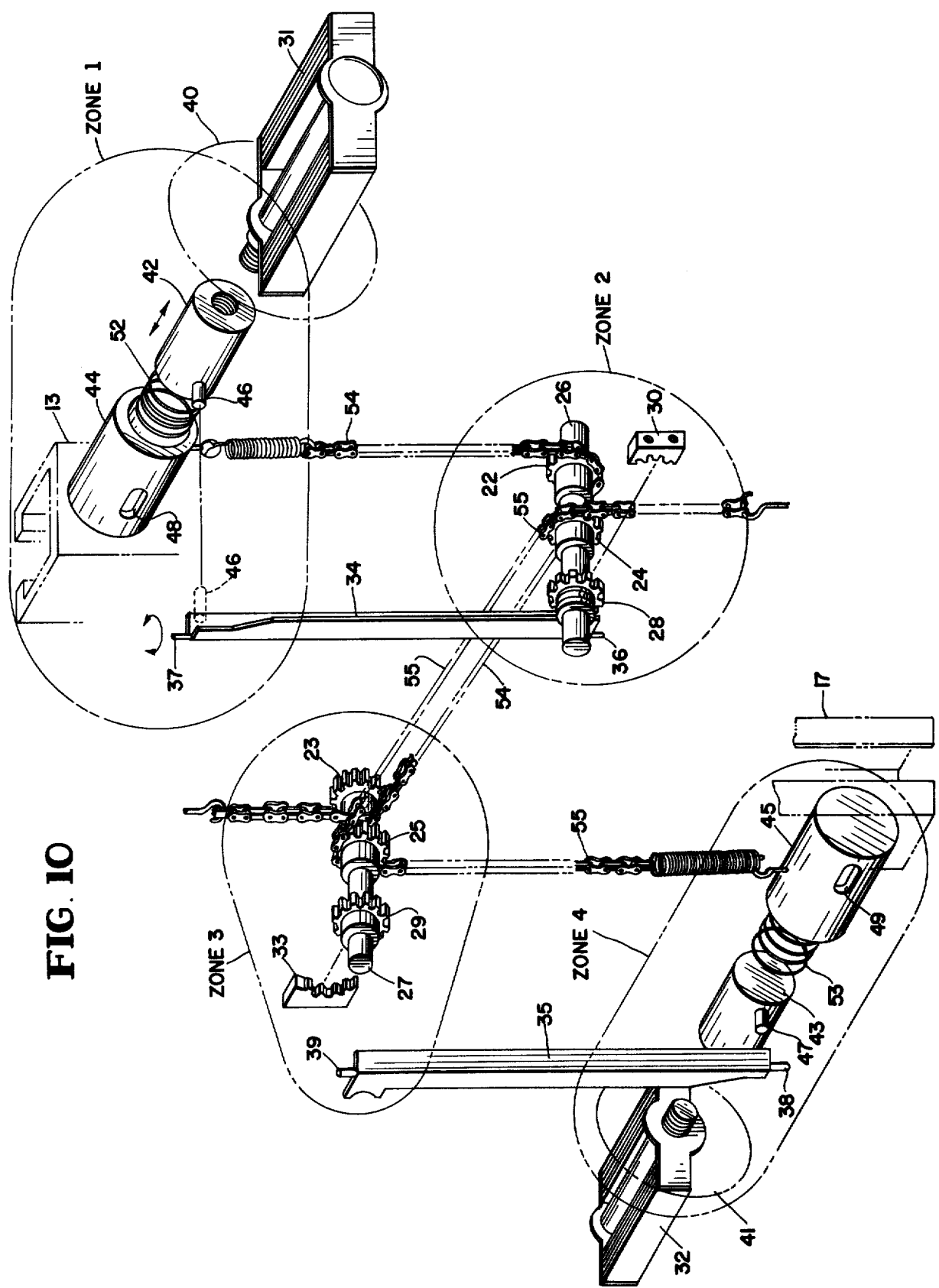

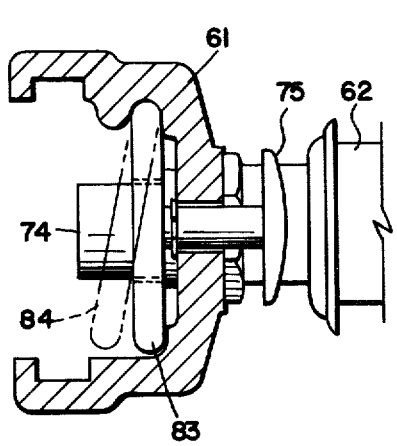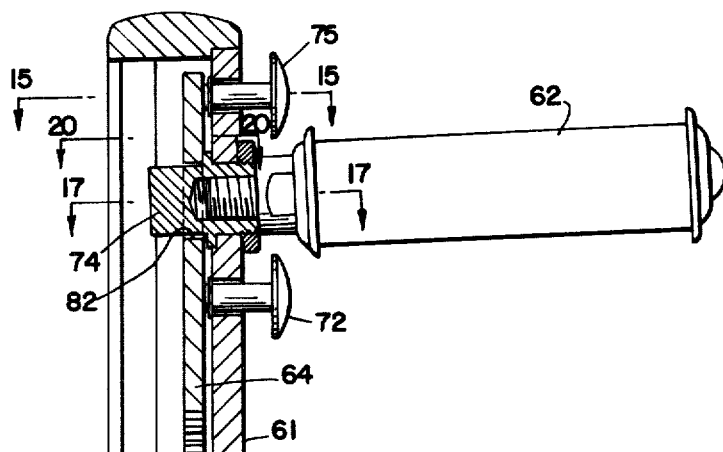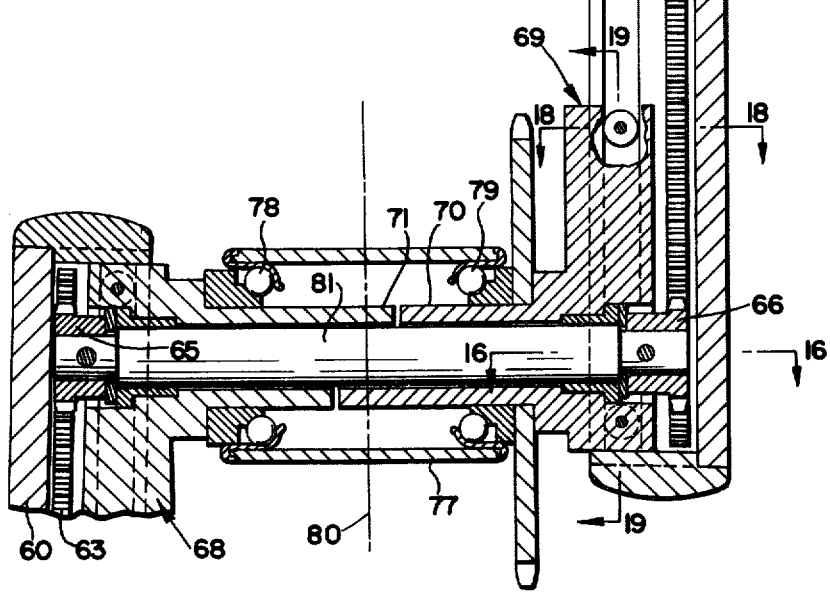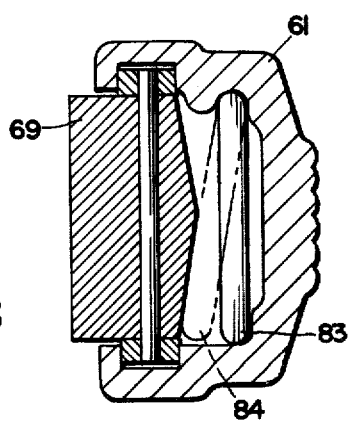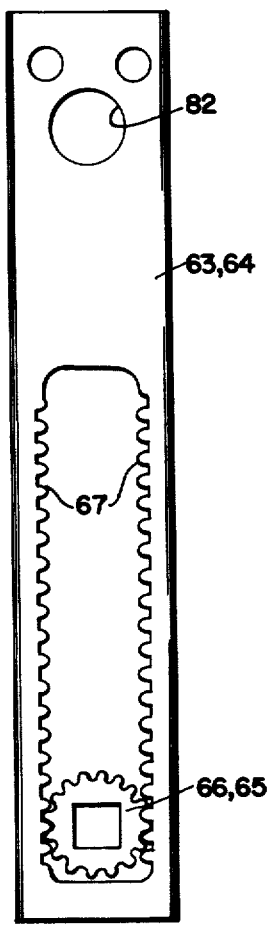
FIG. 15
FIG. 13
FIG. 18
FIG. 14

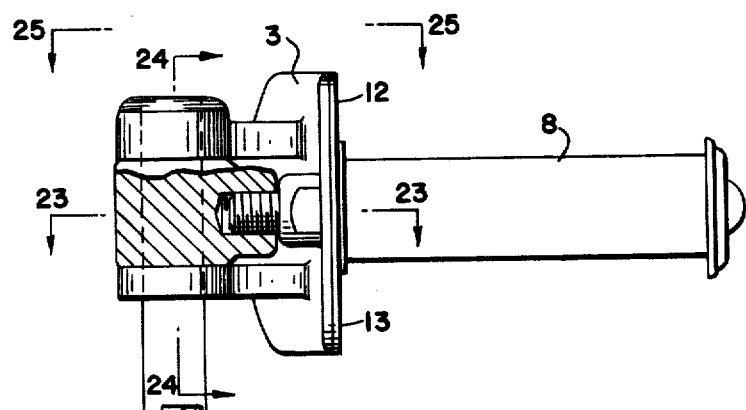
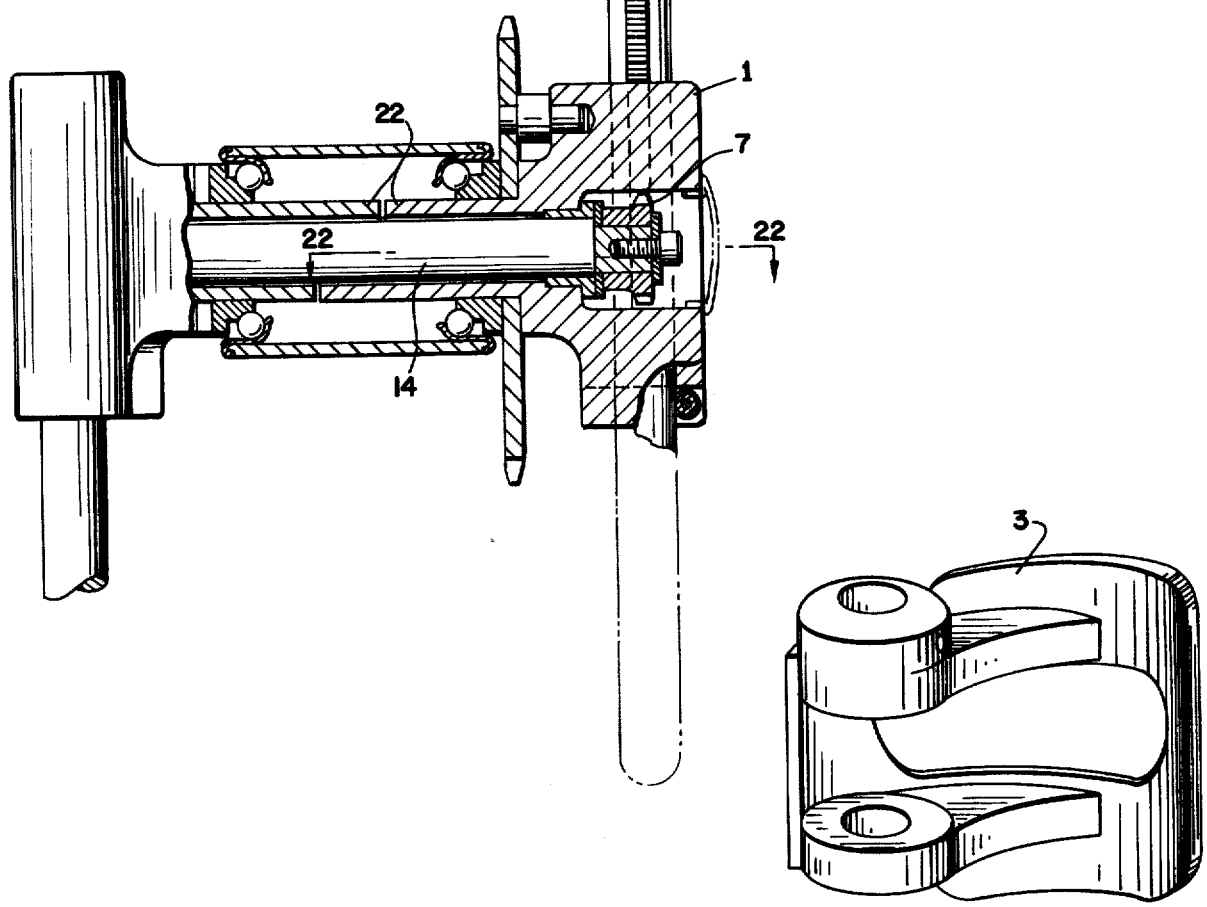
FIG. 21
FIG. 26

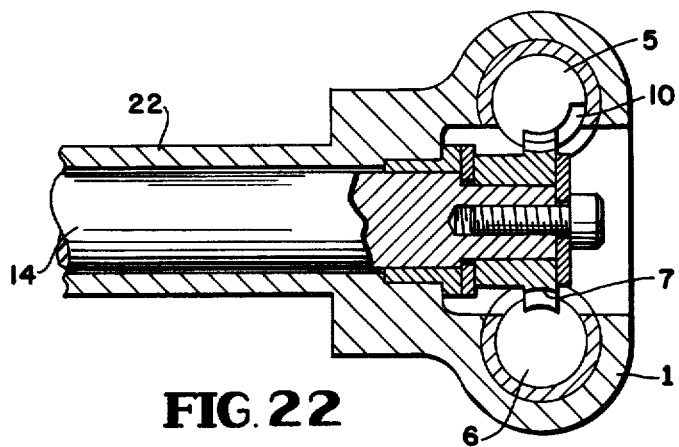
FIG. 22
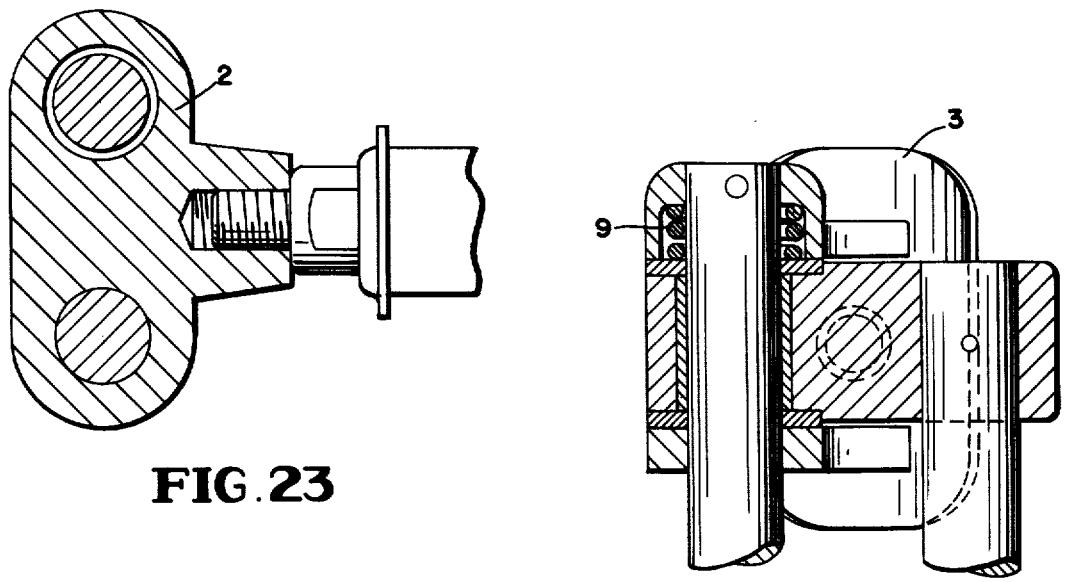
FIG. 23
FIG. 24
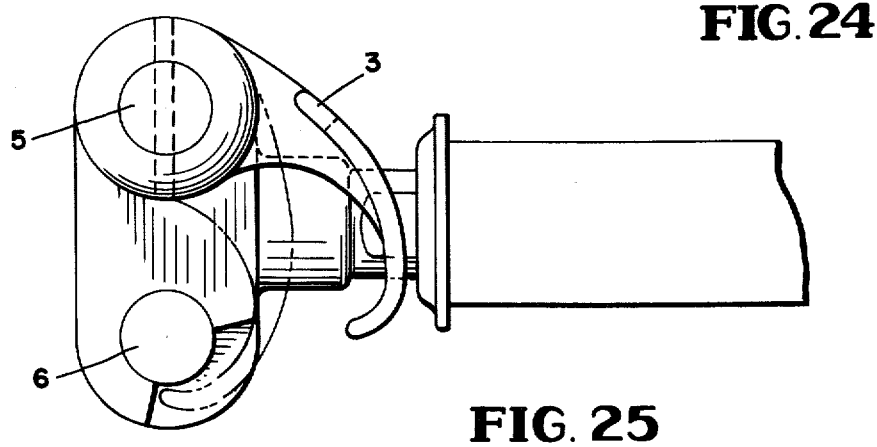
FIG. 25

ADJUSTABLE PEDAL AND CRANK SYSTEM FOR FOOT PROPELLED VEHICLES

A primary object of the present invention is to provide a practical pedal position adjusting system for use on bicycles and like vehicles wherein the effort required by the cyclist to propel the vehicle as desired according to traffic conditions, or conditions of terrain, i.e., level or hilly ground, may be controlled by varying the effective pedal crank arm length. This system eliminates the need for adjustable sprockets, adjustable gear transmissions, or adjustable multiple sprocket chain drives in present widespread use in bicycle pedal drives. The present invention provides a simple, quick and efficient means for varying the pedal crank arm length; the longer the effective crank pedal arm the more torque can be applied by the cyclist to the sprocket drive shaft to meet the extra start up and speed up loads and up hill loads, while the shorter the effective crank pedal arm the less distance the cyclist has to move his legs and feet to propel the bicycle a given distance to merely maintain momentum on level or down hill grades.

Another object of the present invention is to provide an improved system of adjustable pedal cranks for sprocket drives on foot propelled vehicles which may be either installed as original equipment or may be obtained in kit form to modify both single bicycles and other multiple speed bicycles.

A further object of the present invention is to provide a device to vary the effective pedal crank arm lengths which may be easily actuated by the feet and therefore does not require removal of the cyclists hands from the handle bar and brake actuating devices when they are needed for guiding and or braking of bicycles.

A further object of the present invention is to provide a system wherein both pedals are maintained in the same relative rotational angular position to each other and are also maintained in radial synchronism distancewise relative to the drive shaft or sprocket axis throughout all variations or settings of the effective pedal crank arm length.

A further object of the present invention is to provide a rugged, simple, inexpensive construction which may be readily installed on conventional bicycles and which does not employ such delicate, vulnerable and troublesome cable or linkage type controls used in other multiple speed bicycle drives. In the bicycle or foot propelled vehicle art gear shifts have been developed in the so called multiple speed bicycles wherein the structures are complicated and generally fragile, requiring frequent maintenance and adjustments.

A further object of the present invention is to provide a system where the effective pedal crank arm lengths may be adjusted quickly in one step if preferred to whatever extent desired within the limits of the full adjustment range.

A further important object of the present invention is to provide a system where the adjustment and locking of pedal arm length may be made both while the bicycle is at a standstill or while it is in motion. In the present invention numerous changes in pedal arm lengths may be made quickly with foot action while bicycle is in motion and without pedaling and also a quick change in effective length of pedal arms can be made when bicycle is at standstill to provide the instant benefit of a longer pedal arm length with increased torque available to the driving wheel for the very first movement from standstill thereby providing for a quick start.

The prior art fails to teach this quick synchronized adjustment of pedal arm length; for instance in U.S. Pat. No. 823,712. Pedal arm length adjustment might not be completed on both pedal arms after manual adjustment lever is moved until bicycle has traveled approximately 10 to 14 feet or more if the bicycle is equipped with 24 inches diameter wheels or larger — this deprives cyclist of the opportunity of adjusting pedal arm length during standstill for the extra torque to drive shaft so essential for a quick start.

Similarly, in U.S. Pat. Nos. 421,969 and 561,553 any significant pedal arm length adjustment can be achieved only slowly and upon pedaling a substantial distance after manual lever has been moved to allow adjustment of pedal length.

As a consequence, no fast start from standstill is possible unless the cyclist knew beforehand he would stop and further before stopping had traveled the necessary distance after adjusting the manual lever to secure a greater pedal arm length. Further, in U.S. Pat. No. 421,969 the pedal arm length adjustment is made in interrupted stages, with adjustment being made alternately for every pedal cycle, first in one pedal arm and then in the other pedal arm.

With the foregoing and other objects in view the invention will be more fully described hereinafter and more particularly pointed out in the appended claims.

In the drawings in which like parts are denoted by reference characters throughout the several views:

FIG. 3 is a vertical sectional view through the form of the invention shown in FIG. 1 with one pedal in maximum extension and the other pedal at minimum to show position of parts in two positions however in operation both pedals and parts will always be the same distance from the drive shaft.

FIG. 6 is a vertical section taken through the secondary crank arm and pedal construction of the form of the present invention shown in FIGS. 4 and 5, in the drive or pedaling condition.

FIG. 7 is a view identical to FIG. 6 with the secondary crank arm and pedal construction in the disengaged or adjusting condition while selecting a new position for the effective pedal crank arm length.

FIG. 9 is a vertical partially cut-away sectional view of another form of the present invention showing the pedal arms in their most extended positions as well as in their most retracted positions.

FIG. 10 is an exploded view of the invention shown in FIG. 9 and in perspective form showing the elements contained in the various zones 1-2-3 and 4 the locations of which are indicated in FIG. 9.

FIG. 11 is a sectional view of the pedal actuated lock releasing mechanism detail at the pedal end and common to zones 1 and 4.

FIG. 12 is a sectional view of the lock releasing and chain transfer sprockets detail at the drive shaft end and common to zones 2 and 3.

FIG. 13 is a vertical sectional view of another form of the present invention showing only one of the two pedal crank arms and pedal construction with positioning control.

FIG. 14 is an elevational view of the locking and positioning rack employed in the form of invention shown in FIG. 13.

FIG. 15 is a sectional detail of pedal end of arm taken at line 15—15 in FIG. 13 and showing pedal actuated rack tilting means for unlocking rack at driving shaft end of pedal arm.

FIG. 18 is a sectional detail of housing, rock and boss taken at line 18—18 in FIG. 13 and showing roller mounted on shaft in boss.

FIG. 21 is a vertical sectional view of another modified form of the present invention showing only one of the two pedal crank arm assemblies and pedal construction with positioning control.

FIG. 22 is a sectional detail through hub and pedal positioning and synchronizing shaft at line 22—22 in FIG. 21.

FIG. 23 is sectional details at line 23—23 in FIG. 21 showing pedal end housing.

FIG. 24 is a sectional detail at line 24—24 in FIG. 21 showing pedal end housing but at right angles to section in FIG. 23.

FIG. 25 is a view at line 25—25 in FIG. 21 showing mounting of trigger for locking and unlocking pedal arm assemblies.

FIG. 26 shows perspective of trigger 3 in FIGS. 21 and 25.

Unique means are taught in this disclosure for connecting the two pedal arm assemblies on opposite sides of the bicycle through the hollow drive shaft to provide the synchronization of the adjustment of the pedal position on opposite sides of the bicycle.

FIGS. 1 through 8 illustrate one form of the present invention showing various designs incorporating pivoting secondary pedal carrying arms from primary arms to achieve the above mentioned objectives.

FIGS. 9 through 26 illustrate other forms of the invention showing various designs for providing extensible pedal carrying arms from bosses integral with drive shaft to also achieve the above mentioned objectives.

Figure 2:
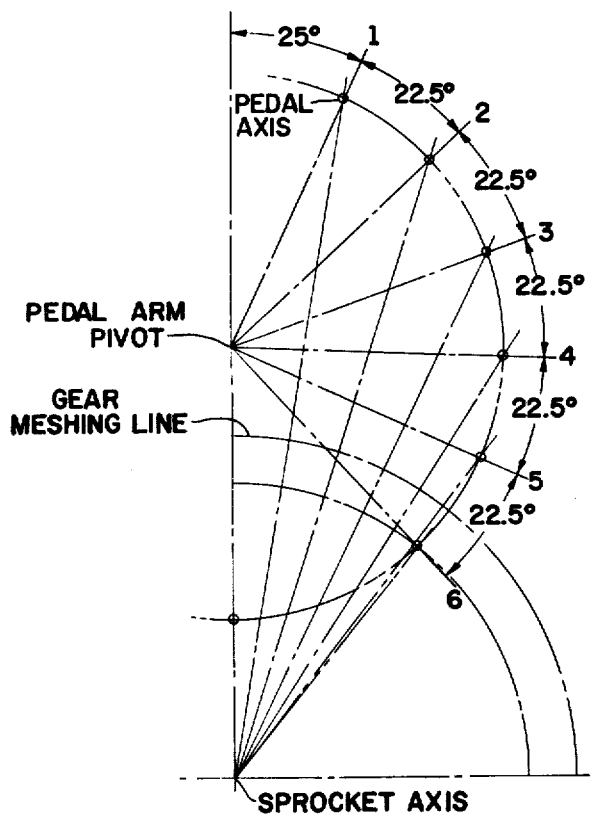
FIG. 2 is a graphic presentation of the effective pedal crank arm length for all variable position of the pedals relative to the sprocket axis.
Figure 1:
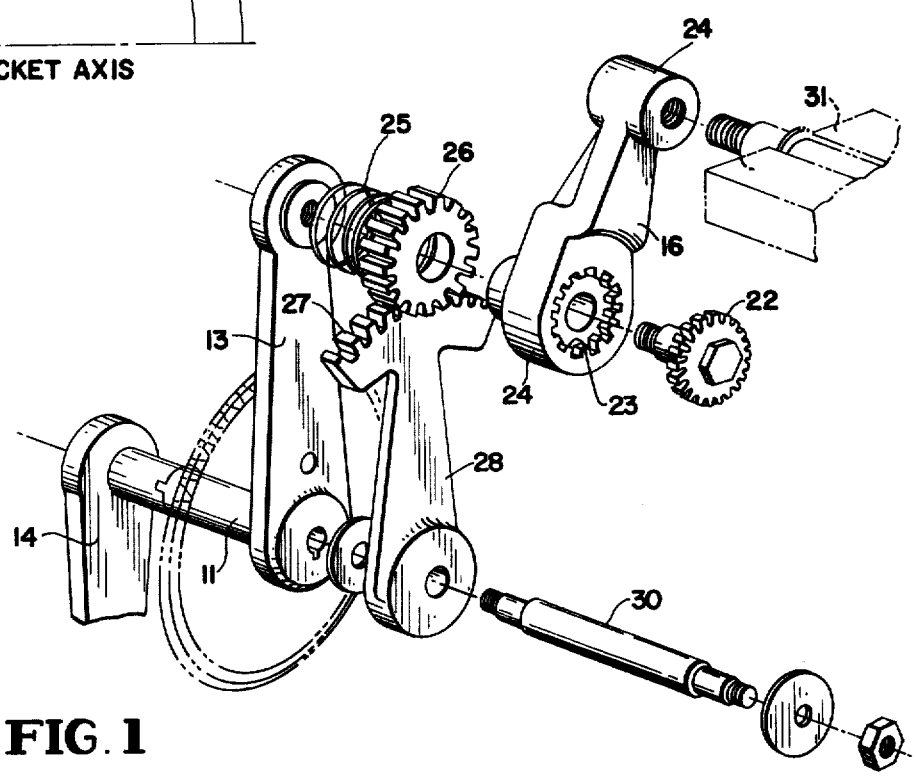
FIG. 1 is an exploded perspective view of one form of the present invention showing only one of two pedal crank arms and pedal constructions with positioning control.
Figure 4:
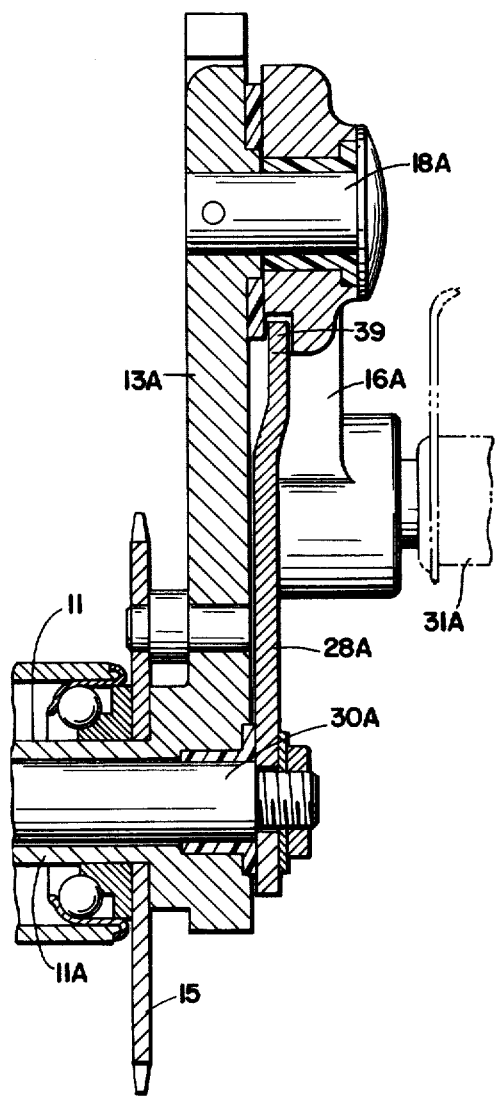
FIG. 4 is a vertical section through a modified form of the invention showing only one crank, there being two cranks employed as in FIG. 3.
Figure 5:
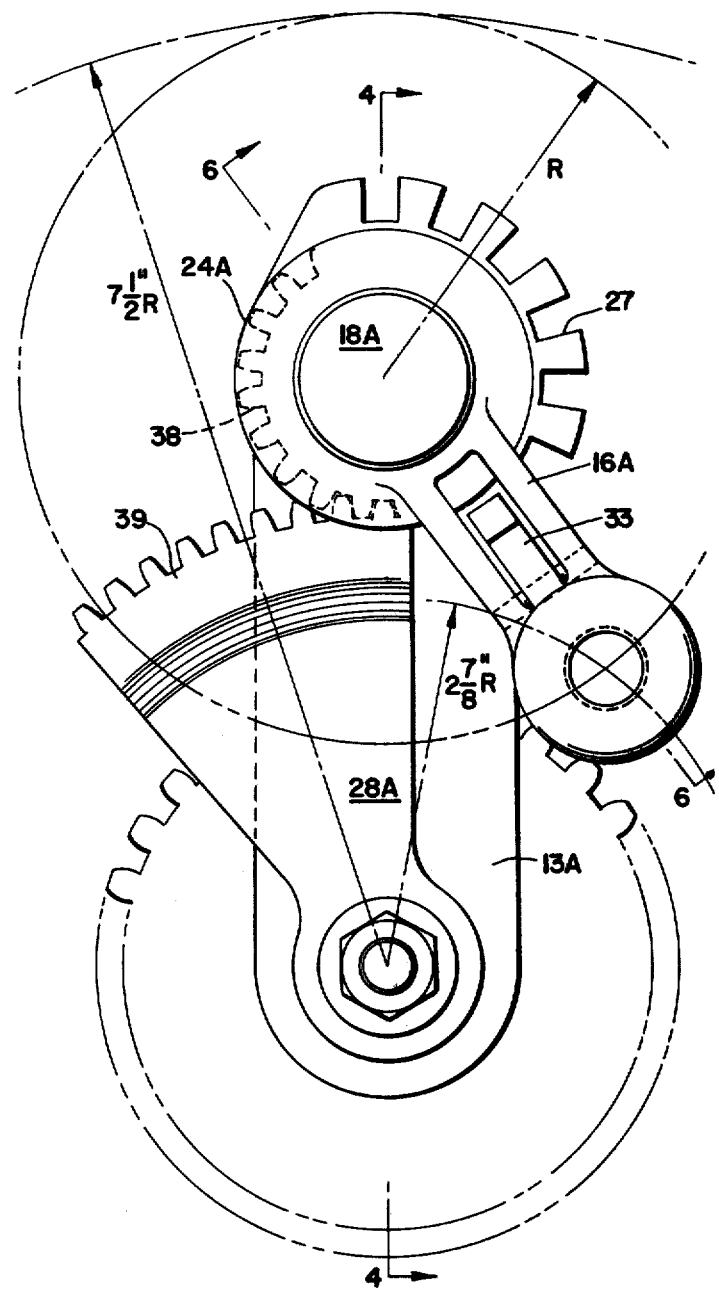
FIG. 5 is an end elevational view of the form of the invention shown in FIG. 4.

Referring now to the drawings and for the moment to FIGS. 1 through 3 inclusive, one embodiment of the present invention is shown in which 10 is a sprocket drive shaft housing on a bicycle frame having a drive shaft 11 mounted therein in bearing supports 12. Secured to the drive shaft 11 at opposite sides of the housing 10 are primary crank arms 13, 14 for compelling rotation of the shaft 11. A chain drive sprocket 15 is secured to be rotated by the drive shaft 11 causing driving of the bicycle chain. At the outer ends of the primary cranks 13, 14 are secondary cranks 16, 17 which are pivotally connected to the primary cranks by pivot bolts 18, 19 which are threadedly secured to the primary cranks at 20, 21. The head end of the pivot bolts 18, 19 have pinion teeth 22 about their peripheries which slidably mesh with teeth 23 in the housing 24 of the secondary cranks 16, 17. The teeth 22 and 23 are urged into axial sliding engagement by a coil spring 25.

The inner part of the housing 24 on each secondary crank has teeth 26 about its periphery which mesh with teeth 27 on quadrant arms 28, 29 which are secured to a positioning shaft 30 which passes concentrically through the drive shaft 11 which maintains the pedals 31, 32 both equidistant from the drive shaft or sprocket axis for any of the changes of the effective pedal arm length shown in FIG. 2.

When pedaling the bicycle on a relatively level or horizontal place the shorter or smaller effective pedal arm length shown at the right hand side of FIG. 3 is employed; however upon approaching a hill where a larger effective pedal arm length is desired to ascend the hill, as shown in the left hand side of FIG. 3, the rider slides his foot and pedal toward the centerline of the bicycle engaging plates 31A and 32A overcoming the loading of spring 25 causing the teeth 22 on the head of the pivot bolts 18, 19 to disengage the teeth 23 in the housing 24 which permits the secondary cranks 16, 17 to rotate about the bolts 18, 19 until the desired effective pedal arm length is attained at which time the rider relaxes the pressure inwardly on the pedals allowing the spring 25 to axially engage gears 22, 23 to resume pedaling.

Attendant to the effective change of effective pedal arm length both pedals 31, 32 must be maintained in synchronism as to their distance radially from the drive shaft. This is accomplished by engagement of the teeth 26 with the teeth 27 on the quadrants on the positioning arms 28, 29 which always assures that pedal 31 is always the same distance radially from the drive shaft 11 as is pedal 32. FIG. 3 shows the maximum on one side and the minimum on the other side; however in practice both effective pedal arm lengths are always equal.

Referring now to FIGS. 4 through 7 inclusive, a modified form of the invention is shown in which the drive shaft 11A has primary crank arms 13A and 14A secured thereto and the secondary crank arms 16A and 17A are pivotally connected thereto by pivot bolts 18A. The primary crank arm 13A has a toothed or slotted quadrant 27 between which is a detent 33 pivoted at 34 to a portion of the secondary crank housing 24A. The pivoted detent 33 has an actuating arm 33A which rides in a groove 35 in an axially slidable pedal mount 36 which has pedal 31A secured thereto and which is biased by spring 37 to the driving engagement of FIG. 6 and which upon moving the pedal to the left as shown in FIG. 7 will cause the detent 33 to disengage from the quadrant slot 27 to permit selection of a new effective pedal arm length.

Teeth 38 on the housing 24A of the secondary arm 13A mesh with and drive quadrant 39 secured to positioning arm 28A which through positioning shaft 30A will maintain both pedals the same radial distance from the drive shaft or sprocket axis.

Figure 8:
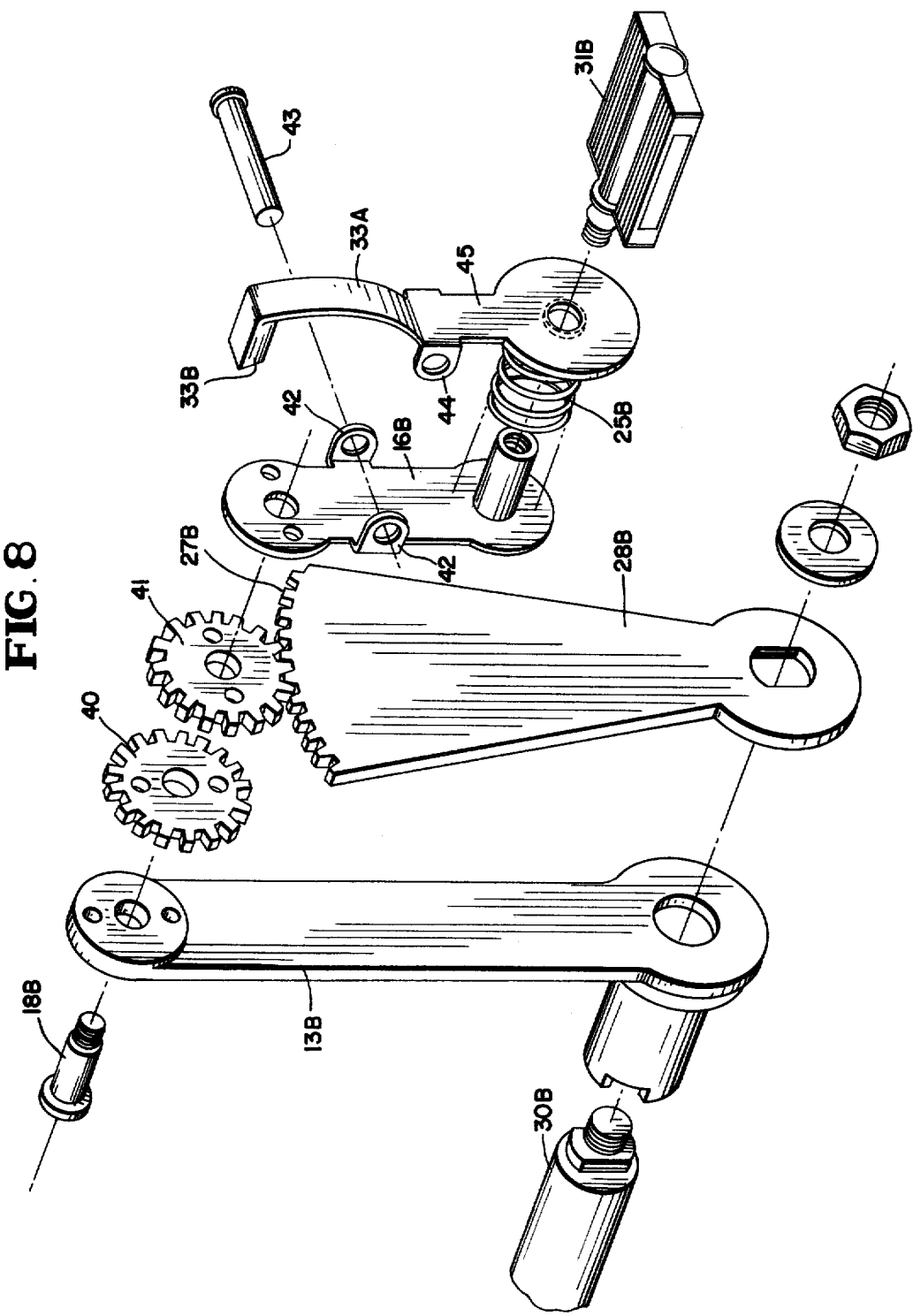
FIG. 8 is a still further modified form of the present invention showing one crank arm and positioning device in exploded perspective form.

Referring now to FIG. 8 a further modified form of the invention is shown wherein the primary crank arm 13B has pivotally connected thereto a secondary crank arm 16B through pivot bolt 18B. A pinion gear 40 is secured to the free end of the primary crank arm 13B and a pinion gear 41 is secured to the secondary arm 16B. A pair of lugs 42 accommodate a pivot pin 43 which is at a right angle to the pivot bolt 18B. A detent latch 33A has lugs 44 which supports the pivot pin 43. Below the pivot pin is a foot engagable plate 45 which is spring loaded through spring 25B outwardly which normally biases the tapered projection 33B into engagement with the teeth of pinions 40, 41 to connect the pedal 31B into driving engagement with the primary crank arm 13B.

In operation when it is desired to change the effective pedal arm length the bicycle operator moves his foot inwardly toward the bicycle frame to engage the plate 45 causing the detent 33A to rock about pivot 43 and to disengage the projection 33B from the teeth of pinions 40, 41 which permits the secondary arm to rotate about pivot 18B until the new desired setting is attained at which time pressure on plate 45 is released and spring 25B causes the detent to rock with the projection 33B engaging between the teeth of pinions 40, 41 to the new setting. The positioning arm 28B operating through shaft 30B keeps both pedals in synchronism so that each pedal is at all times the same radial distance from the drive shaft as the other pedal.

Referring now to the drawings 9 thru 12 inclusive another embodiment of the present invention is shown in which 10 is a sprocket drive shaft housing on a bicycle frame having a drive shaft 11 mounted therein in bearing supports 12. Drive shaft 11 is integral with a boss 11a (FIG. 12), the axis of which extends essentially at right angle to the axis of drive shaft 11. The boss 11a extends inside of and for approximately one-third of the length of arm 13 and toward the end carrying the pedal 31.

The drive shaft 11 dovetails with drive shaft 14 at the center line of bicycle frame as shown at 16 in FIG. 9 providing proper alignment of pedal arm assemblies on opposite sides of bicycle. Arm 13 is free to slide over boss 11a as is arm 17 free to slide over boss 14a. The movement of arms 13 and 17 are synchronized to insure the distance of the pedals 31 and 32 from the drive shafts 11 and 14 being always equal during period of adjustment as well as when locked in operation position. This synchronized and equal movement of arms 13 and 17 is due to the interconnection of the arms by link chains 54, 55 attached to the arms near their ends — one end of chain 54 (FIG. 10) is attached to arm 13 near pedal end 18 and the other end of chain 54 is attached to arm 17 near end 21. Similarly, one end of chain 55 (FIG. 10) is attached to arm 17 near pedal end 20 and the other end of chain 55 is attached to arm 13 near end 19. Each of the two chains 54, 55 mesh with transfer sprockets (FIG. 10 and 12) — chain 54 meshing with transfer sprockets 22 and 23 and chain 55 meshing with transfer sprockets 24 and 25. The transfer sprockets 22 and 24 are integrally connected through shaft 26 and sprockets 23 and 24 are integrally connected through shaft 27. Each chain is spring loaded beyond normal tension resulting from pressure on pedal by cyclist when chains are locked by gears 28 and 29 which are meshed with locking blocks 30 and 33 respectively. Gears 28 and 29 are keyed to shafts 26 and 27 respectively but are slidably mounted on said shafts so that they can be moved out of engagement and back into engagement with locking blocks 30 and 33. The engagement and disengagement of the locking gears 28 and 29 from locking blocks 30 and 33 respectively is accomplished by opposite angular rotation of control angles 34 and 35 about their journals 36–37 and 38–39 respectively.

In operation the angular movement of angles 34 and 35 is required to unlock the shafts 26 and 27 and is caused by the cyclist exerting pressure with both feet inwardly toward the center of bicycle and against foot pressure discs 40 and 41 such pressure moves sliding sleeves 42 and 43 against pressure of spring 52 and 53 into housings 44 and 45 resulting in inward movement of pins 46 and 47 which extend through slots 48 and 49 in wall of housing 44 and 45. The movement inward of these pins 46 and 47 brings them against the web of control angles 34 and 35 to cause the unlocking angular movements of the control angles. With the shafts 26 and 27 unlocked and free to turn and with inward horizontal pressure continue to be held by the feet of the cyclist against the pressure discs on the pedals and with one pedal up and the other in a down position the cyclist can adjust the effective length of the pedal arms by pressing straight down on the proper pedal and releasing the vertical pressure on the other pedal. Pressure on the low pedal will cause a longer effective arm for both pedals — conversely straight downward pressure on the high pedal will cause a shorter effective arm for both pedals. When the cyclist has adjusted the pedal arm length to suit his desire the inward horizontal foot pressure is released and the pressure of springs 52 and 53 act to move outward the pedals 31 and 32 as well as the sliding sleeves 42 and 43 and pins 46 and 48 from contact with the control angles 34 and 35 and return springs 50 and 51 (FIG. 12) move the sliding gears 28 and 29 into engagement with locking blocks 30 and 33 and the cyclist may then peddle with the new preferred locked effective pedal arm length.

Referring now to drawings 13 through 20 inclusive another embodiment of the present invention is shown in which 77 (FIG. 13) is a sprocket drive shaft housing on a bicycle frame having dovetailing drive shafts 70 and 71 mounted therein in bearing supports 78 and 79. Drive shaft 70 is integral with boss 69 and similarly drive shaft 71 is integral with boss 68 (not shown). The two bosses 68 and 69 extend at a small angle off the perpendicular to the axis of the drive shafts but in opposite directions and in offset relations one to the other, each being on the opposite side of the center line of the bicycle from the other. The drive shafts 70 and 71 are dovetailed together at the center line of the bicycle at 80 providing proper alignment of the pedal arm assemblies on opposite sides of the bicycle.

Figure 16:
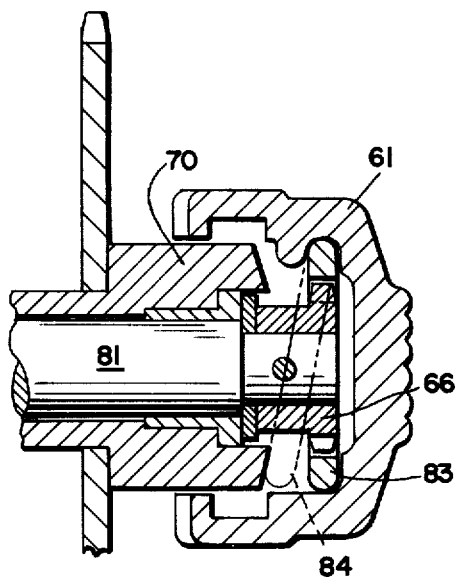
FIG. 16 is a sectional detail of rack showing rack both in locked position as well as in unlocked and pedal arm length adjusting position.
Figure 17:
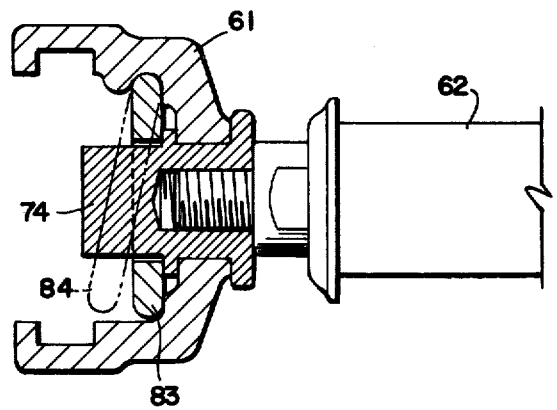
FIG. 17 is a sectional detail of pedal of arm taken at line 17—17 in FIG. 13 and showing rock hinge socket extending length of housing.
Figure 20:
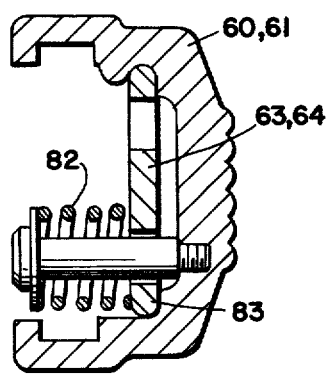
FIG. 20 is a sectional detail through housing at line 20—20 in FIG. 13 showing detail of rock spring 82 for keeping rock in straight or engaged position with pin or gear on opposite sides of pinion to lock pedal housing arm in fixed position.
Figure 19:
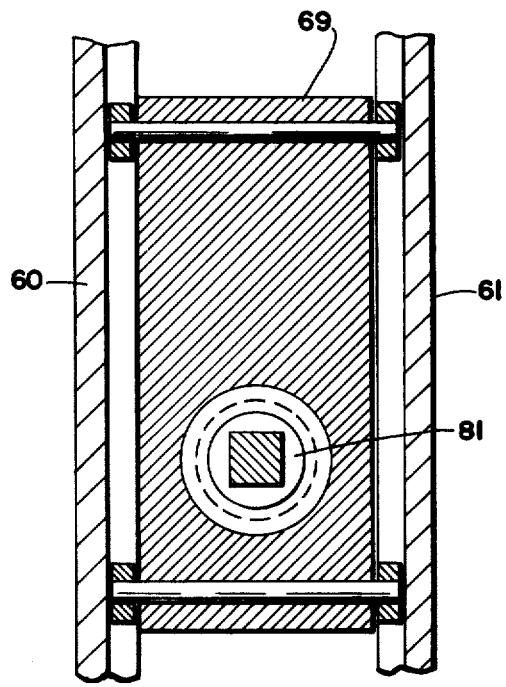
FIG. 19 is a sectional detail of boss at line 19—19 in FIG. 13 showing roller location in track in housing and taken at right angle to section 18.

The bosses 68 and 69 extend inside of and for approximately one-third of the length of arms 60 and 61 respectively and toward the ends carrying the pedals — only one pedal 62 being illustrated in FIG. 13. Arms 60 and 61 are free to roll along the bosses 68 and 69. The rolling movement of arms 60 and 61 are synchronized to insure the distance of the two pedals from the axis of the drive shafts 70 and 71 being always equal during the period of adjustment as well as when locked in pedaling position. The rolling movements of the arms 60 and 61 are synchronized by the central shaft 81 which carries fixed gears 65 and 66 at its ends and which gears mesh at all times with one of the line of gear teeth 67 in racks 63 and 64 respectively, the racks being provided with hole 82 (FIG. 14) through which plug 74 extends locking the rack 64 to the arm 61 insofar as not allowing any longitudinal movement to occur between the rack and the arm. Any sliding movement of either arm 60 or 61 along their respective bosses 68 or 69 would cause the other arm to move a like distance to maintain at all times an equal distance of both pedals from the axis of the drive shafts. For adjustment in arm lengths to occur the rack must be in a tilted position as indicated in FIG. 16 where only one of the two opposed line of gear teeth 67 (FIG. 14) of both racks 63 and 64 engage the adjusting and locking gears 65 and 66. When the gear racks 63 and 64 are not tilted and are in a straight position as indicated by 83 in FIG. 16 then both of the opposed lines of gear teeth 67 in racks 63 and 64 are engaged on opposite sides of and with adjusting and locking gears 65 and 66. In this situation the arms 60 and 61 are in locked position and set for pedaling operation.

In operation the racks 63–64 are kept in straight or locked position 83 by spring 82 (FIG. 20) during pedaling. To adjust pedal crank arm length the pedals are brought by the feet of the cyclist to a position where one crank pedal is in the up position and the other is in the down position. While in these positions and while coasting if bicycle is in motion the foot on the high pedal is used by cyclist to press button 75 toward center line of bicycle and at the same time uses his other foot on low pedal (not shown) to press the counterpart of button 72 toward the center line of bicycle. When both buttons are moved toward center line of bicycle, both racks 63–64 are moved against spring pressure from straight or locked position 83, FIG. 20, to tilted position 84, FIG. 15, and the racks are no longer locked to gears 65–66 and the length of the pedal crank arms can be adjusted to suit desires of cyclist. To lengthen pedal arms the low pedal is pressed downward and foot pressure on high pedal is relieved to permit pedal to rise. This adjustment is made while foot pressure is maintained toward center line of bicycle with feet of cyclist against buttons 75 and counterpart of 72. By releasing this pressure on buttons 75 and counterpart of 72 the racks move back under spring pressure to locked position for pedaling.

A modified form of the invention illustrated in FIGS. 13 through 20 and described above is illustrated in FIGS. 21 through 25 — in place of the two opposed lines of rack gear teeth 67 in FIG. 14 the form of the present invention shown in FIGS. 21 through 25 employs two round crank arms 5 and 6 shown in FIG. 22 both of which arms are provided with rack gear teeth along a portion of their length for engagement with pinion gear 7 in FIG. 22. When the gear teeth of both crank arms 5 and 6 are engaged with pinion gear 7 the arms cannot slide in hub 1 in FIG. 21 and the pedal end housing 2 in FIG. 21 and pedal 8 in FIG. 21 are in locked position for pedaling.

Crank arm 6 is fixed to pedal end housing 2, FIGS. 23 and 24, and arm 5 is locked against longitudinal movement in housing 2 by trigger lever 3, FIGS. 21 and 25, but arm 5 is free to rotate in housing 2. The configuration of the rack gear teeth in arm 5 are such that they engage the teeth of the pinion gear 7 when the arm 5 is rotationally positioned by the influence of the spring 9 shown in FIG. 24 but when trigger lever 3 is moved toward arm 6, FIG. 25, the arm 5 is rotationally positioned where the teeth of pinion gear 7 are no longer engaged by the teeth in arm 5 but are in line with a groove 10, FIG. 22, in arm 5 and arms 5 and 6 are free to slide in hub 1 to provide a different effective pedal arm length from the axis of power shaft 22 shown in FIG. 21.

In operation the arm rod 5 is kept in rotational position to engage the rack gear teeth of 5 with the teeth of pinion gear 7 or in locked pedal arm position for pedaling.

To adjust pedal crank arm length the pedals are brought by the feet of the cyclist to a position where one crank pedal is in the up position and the other is in the down position. While in these positions and while coasting if bicycle is in motion the foot on the high pedal is used by the cyclist to press unlocking trigger 3 on face 12, FIG. 21, toward the center line of the bicycle and at the same time the cyclist uses his foot on the low pedal (not shown in FIG. 21) to press counterpart of unlocking trigger 3 on face 13, FIG. 21, toward the center line of the bicycle. When both triggers are moved as far as possible toward center line of bicycle, gears on arms 5 of both pedal arm assemblies are disengaged from pinion gears 7 at both ends of pedal positioning transfer shaft 14, FIG. 21, the pedal arm assemblies can then be adjusted to provide the desired effective pedal distance from drive shaft 22, in FIG. 21. The rack gear of arm 6 and its counterpart on the opposite side of the bicycle always remains engaged with the teeth of pinion gears 7 and its counterpart, at opposite ends of pedal positioning shaft 14, the movements of the two pedal arm assemblies are thereby always synchronized to provide that distance of both pedals from axis of drive shaft 22 remains equal at all times even during adjustment movement. To lengthen the pedal arms the low pedal is pressed downward and foot pressure on high pedal is released to permit the pedal to rise. This adjustment is made while foot pressure is maintained toward center line of bicycle with feet of cyclist against unlocking triggers 3 and the counterpart on face 12 and 13. By releasing the pressure on triggers 3 the arms 5 and its counterpart return to engage or locked position for pedaling.

While FIGS. 9 through 26 illustrate those forms of the invention where the pedal carrying arm is extensible from a hub or boss which is integral with drive shaft, the generic concept of this invention includes the mounting of a pedal in a block which could move along an arm which is integral with a drive shaft and where the movement of the slidably mounted pedal in an arm assembly on the opposite side of the bicycle and where the pedals in the system could be locked on the arm in fixed position relative to axis of drive shaft during the pedaling periods and otherwise except when foot pressure on lock release levers or buttons would disengage lock engaging means to permit adjustment of pedal positions all quite within the scope of the above teachings and to achieve the above outlined objectives.

What I claim is:

1. An adjustable pedal crank system for bicycles and the like for compelling rotation of the drive shaft, comprising a pair of primary drive cranks secured to said drive shaft, a pair of secondary drive cranks connected to the primary cranks and each having a pedal, means for locking said secondary drive cranks at any angular position of the secondary cranks relative to the primary cranks for propelling the vehicle, and foot actuated interconnecting means between both sets of secondary cranks for maintaining both pedals at equal distance from the drive shaft at all times even while effecting change of pedal drive arm length from the drive shaft axis.

2. A system as claimed in claim 1 wherein the connection between said primary and secondary cranks is a pivot shaft secured to one of said primary or said secondary cranks and interlocking means selectively engagable therebetween.

3. A system as claimed in claim 2 wherein said interconnecting means comprises a toothed pinion secured to the pivotal end of each secondary crank and a pair of toothed quadrant members each member of the pair in mesh with one of said toothed pinions at one end and secured to rotate with a positioning shaft at the other end, said positioning shaft being secured at each of its ends to one of the toothed quadrant members.

4. A system as claimed in claim 1 wherein said secondary drive cranks are pivotally connected to the free end of said primary drive cranks and said means for locking said secondary drive cranks at any angular position of the secondary cranks relative to the primary cranks is an axially slidable meshing gear-like connection with spring means normally biasing the meshing gears into locked interconnection.

5. A system as claimed in claim 1 wherein a toothed positioning segment is secured to the primary arm and a pivoted locking latch is actuated by the pedal on the secondary arm and is spring loaded to a normally locked position.

6. A system as claimed in claim 1 wherein said means for locking said secondary drive cranks at an angular position of the secondary cranks relative to the primary cranks is a latch pivoted at a right angle to the axis of pivot between said primary and secondary cranks and having a detent engaging teeth of a pinion secured to the primary crank on one side of the latch pivot and a foot engagable means, spring biased to normally urge the detent into engagement with the pinion teeth on the opposite side of the latch pivot.

7. An adjustable pedal and crank system for bicycles and the like for compelling rotation of the drive shaft comprising:
   a. a drive shaft,
   b. two crank arm means having adjustable effective pedal arm lengths,
   c. pedals on said crank arm means,
   d. foot actuated interconnecting means between the pedals of said crank arms to automatically maintain both pedals an equal distance from said drive shaft throughout all variations of change of pedal arm length,
   e. and drive connecting means between said pedal arms and drive shaft.

8. An adjustable pedal and crank system for bicycles and the like for compelling rotation of the drive shaft comprising:
   a. a drive shaft,
   b. two crank arm means having adjustable effective pedal arm lengths,
   c. pedals on said crank arm means,
   d. foot actuated interconnecting means between the pedals of said crank arms to automatically maintain both pedals an equal distance from said drive shaft throughout all variations of change of pedal arm length, comprising chain means connected to be actuated by said pedals, passing through the drive shaft and being connected to the other end of the opposed crank arm on the opposite side of the bicycle.

9. An adjustable pedal and crank system for bicycles and the like for compelling rotation of the drive shaft comprising:
   a. a drive shaft,
   b. two crank arm means having adjustable effective pedal arm lengths,
   c. pedals on said crank arm means,
   d. foot actuated interconnecting means between said pedal means and interconnection means comprising a shaft with gear means at both ends for engagement with racks, each having two opposed lines of gear teeth, one of which line of gear teeth in both racks are disengagable from locking engaging position thereby allowing foot acutated positioning of the pedals to desired effective pedal arm lengths while automatically maintaining pedals at an equal distance from said drive shaft throughout all variations of change of pedal arm length.

10. An adjustable pedal and crank system for bicycles and the like for compelling rotation of the drive shaft comprising:
    a. a drive shaft,
    b. two crank arm means having adjustable effective pedal arm lengths,
    c. pedals on said crank arm means,
    d. foot actuated interconnecting means between the pedals of said crank arms passing through the drive shaft to automatically maintain both pedals an equal distance from said drive shaft throughout all variations of change of pedal arm length,
    e. and drive connecting means between said pedal arms and drive shaft.

* * * * *